US007840365B2

(12) United States Patent
Kahr et al.

(10) Patent No.: US 7,840,365 B2
(45) Date of Patent: Nov. 23, 2010

(54) INTEGRATED CIRCUIT ARRANGEMENT FOR CURRENT REGULATION

(75) Inventors: Victor Kahr, Hart bei Graz (AT); Harald Panhofer, Graz (AT); Manfred Steiner, Bad Gams (AT)

(73) Assignee: Infineon Technologies AG, Neubiberg (DE)

( * ) Notice: Subject to any disclaimer, the term of this patent is extended or adjusted under 35 U.S.C. 154(b) by 870 days.

(21) Appl. No.: 11/736,870

(22) Filed: Apr. 18, 2007

(65) Prior Publication Data

US 2007/0288188 A1 Dec. 13, 2007

(30) Foreign Application Priority Data

Apr. 27, 2006 (DE) ...................... 10 2006 019 681

(51) Int. Cl.
*G01D 18/00* (2006.01)

(52) U.S. Cl. ......................... 702/64; 361/152; 361/154; 361/139; 702/130

(58) Field of Classification Search .................. 702/64, 702/130; 327/427, 434; 361/152, 154, 139; 323/271
See application file for complete search history.

(56) References Cited

U.S. PATENT DOCUMENTS 5,673,165 A * 9/1997 Kuhn et al. ................. 361/154
5,982,161 A 11/1999 Nguyen et al.
6,294,905 B1 9/2001 Schwartz
6,313,617 B1 11/2001 Engelmann et al.

FOREIGN PATENT DOCUMENTS

DE 20004909 U1 7/2001

* cited by examiner

*Primary Examiner*—Drew A Dunn
*Assistant Examiner*—Hien X Vo
(74) *Attorney, Agent, or Firm*—Dicke, Billig & Czaja, PLLC

(57) ABSTRACT

An integrated circuit arrangement for current regulation of an electromagnetic load, especially an electric motor, generator, solenoid valve, or the like, with a coil, a power switch element, and a freewheeling diode is disclosed. In one embodiment, the circuit arrangement has an integrated measurement resistor for measuring the coil current. The measurement resistor is arranged in a freewheeling path of the circuit arrangement in series between the freewheeling diode and the power switch element, and has a digital processing means connected after a voltage measurement device assigned to the measurement resistor for at least partial compensation of resistor manufacturing variations and/or temperature fluctuations in the voltage signal and/or an error due to analog voltage signal processing.

18 Claims, 5 Drawing Sheets

INTEGRATED CIRCUIT ARRANGEMENT FOR CURRENT REGULATION

CROSS REFERENCE TO RELATED APPLICATION

This Utility Patent Application claims the benefit of the filing date of German Application No. 10 2006 019 681.3, filed Apr. 27, 2006, which is herein incorporated by reference.

BACKGROUND

The invention relates to an integrated circuit arrangement for current regulation of an electromagnetic load.

Such circuit arrangements have been known for a long time for controlling electric motors, generators, solenoid valves, or the like and have also been in practical use. The use of such circuits for regulating the charging of automobile batteries during motor and generator operation shall be mentioned merely as one example.

For such circuit arrangements, which are also designated as "clocked systems" and which are essentially composed of a coil, a power switch, and a freewheeling diode, an exact measurement of the coil current represents an important technical problem. This current measurement is usually performed by using a measurement resistor (the shunt), which is external or also internal to the circuit and whose voltage drop is fed to a measurement amplifier.

For this measurement principle, the small magnitude of the voltage drop on the shunt on the one hand and large common mode jumps on the amplifier input (caused by the transitions between battery voltage and negative voltages in the freewheeling case) on the other hand represent a technical problem, which has heretofore prevented the realization of shunt systems from operating completely satisfactorily.

SUMMARY

One aspect of the invention is based on the problem of preparing an improved integrated circuit arrangement of the type according to the class, which operates with sufficient accuracy especially under all relevant operating conditions (for example, for the use in a system for controlling the charging current in a passenger vehicle).

One aspect of the invention includes providing an on-chip measurement resistor for measuring the coil current in the freewheeling path of the control circuit. It further includes the concept of processing and compensating for manufacturing variations in the resistance value, which are technologically unavoidable in this realization, and also compensating for the consequences of the temperature dependence in a digital part of the control circuit. Accordingly, digital processing means are connected after the voltage measurement device assigned to the measurement resistor for at least partial compensation of resistor manufacturing variations and/or temperature influences on the voltage signal and/or an error due to analog voltage signal processing.

With regard to the fact that the voltage measurement device typically includes a measurement amplifier with an offset and an amplification error, the digital processing means are formed in a construction of the circuit arrangement for offset correction and for linked correction of the error resulting from the resistor manufacturing variations and the amplification error.

In another construction of the proposed circuit arrangement, a temperature sensor is assigned at least indirectly to the measurement resistor, whose temperature measurement signal is fed to the digital processing means for temperature compensation of the voltage signal based on a stored correction curve. Here, the temperature sensor is arranged on the chip carrying the circuit arrangement, such that it detects the temperature of the chip.

In another construction, the circuit arrangement has error correction control means for applying an input current rising linearly with a preset gradient for executing a process for the error detection and compensation quantity determination.

Another construction is distinguished in that the voltage measurement device has a full differential measurement amplifier and a sample-and-hold circuit connected to its output for providing voltage measurement values during only a freewheeling operating phase of the circuit arrangement. Here the output of the sample-and-hold circuit is connected to the input of a low-pass filter. This involves especially a filter with an adjustable cutoff frequency. Its output is connected, in turn, to the input of an A/D converter and this outputs—as a result of the mentioned process control—digitized voltage measurement values only from the freewheeling operating phase.

Furthermore, the circuit construction, which is constructed for measurement only in the freewheeling operating phase, has measurement process control means for deactivating and reactivating the power switch element as a function of a predefined time dependence of the coil current. In particular, the measurement process control means responds when a preset time period for a pure direct current elapses and triggers the current measurement in the freewheeling operating phase. The cutoff frequency of the low-pass filter is increased during the short freewheeling operating phase, especially to approximately half the sampling rate of the A/D converter.

Another refinement of this construction is distinguished in that the voltage measurement device has two differential amplifiers connected one behind the other by using a resistor network with inverse input polarity and between ground and the input of the sample-and-hold circuit, in which, on the input side, a level-shifter function is realized. This allows the elimination of a separate level shifter, which might otherwise be necessary with regard to the input-side voltage relationships of the measurement circuit. The second differential amplifier is used for obtaining a ground-relative signal from the differential signal supplied by the first differential amplifier.

The feeding of the measurement result obtained in an improved way is performed so that the digital processing means is directly connected on the output side to the input of a driver stage of the power switch element for its activation or deactivation as a function of a corrected measurement value of the coil current.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
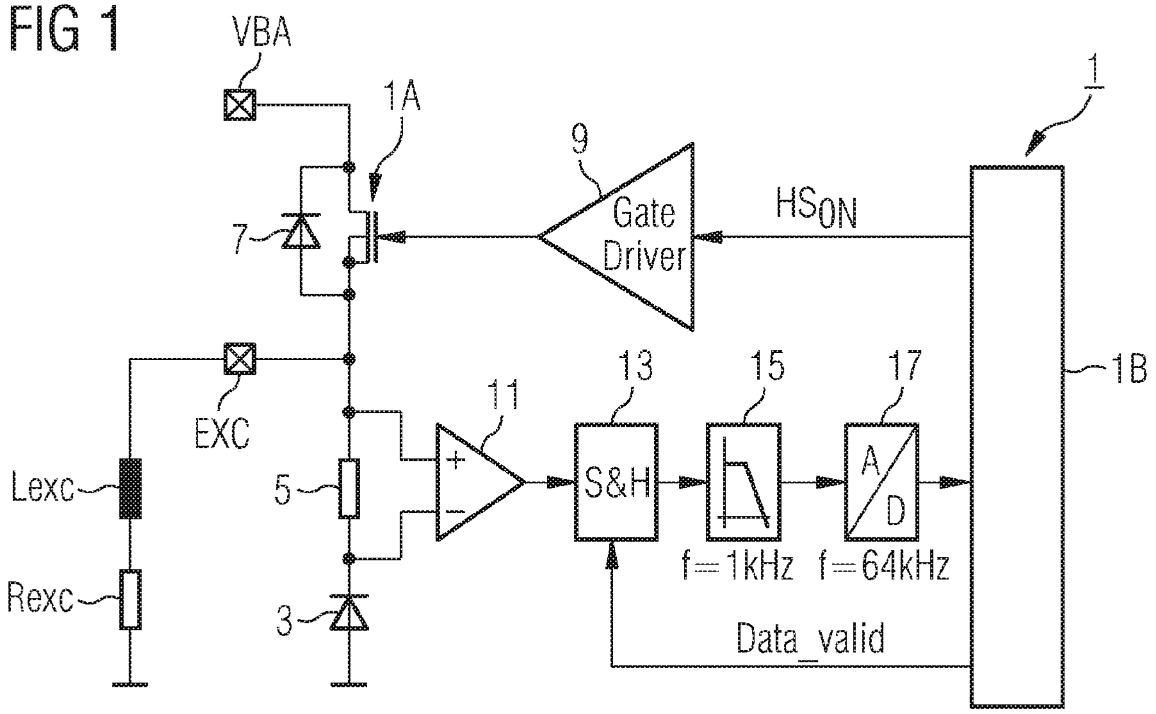
FIG. 1 illustrates a block circuit diagram of an embodiment of the circuit arrangement according to one embodiment.

FIG. 1 illustrates the block circuit diagram of a battery voltage regulating circuit 1 as an embodiment of the circuit arrangement according to one embodiment and is largely self-explanatory due to the selected symbols. VBA designates the battery voltage and EXC designates the exciting coil of a generator, whose inductance is designated by Lexc and whose ohmic resistance is designated by Rexc.

An analog section 1A of the circuit 1 is formed by a freewheeling diode 3, which is connected between ground and the battery voltage VBA, the on-chip measurement resistor 5, and a power switch element 7, which is constructed here as a DMOS transistor and whose gate is driven by using a driver circuit 9. The voltage drop across the measurement resistor 5 is fed on one side to a measurement amplifier (differential amplifier) 11, whose output is connected to the input of a sample-and-hold circuit 13, whose operation is controlled by a process controller (not illustrated separately here) in a digital section 1B of the circuit 1.

On the output side, the sample-and-hold circuit 13 is connected to the input of a 1 kHz low-pass filter 15, whose output is connected, in turn, to the input of a 64 kHz A/D converter 17. The output of the A/D converter 17 is connected to an input of the digital section 1B, and this is connected, in turn, on the output side to an input of the driver circuit 9.

The voltage drop, which is also designated, for short, as the "shunt voltage," across the measurement resistor 5 is given from the relationship U=I*Rsense, where Rsense is the resistance value of the shunt (measurement resistor) 5. This resistance value is subject to process-dependent variations relative to a preset nominal value; therefore, the relationship Rsense=Rnom+/−dR is valid. In addition, the resistance value Rsense is subject to a temperature profile according to the relationship Rsense=Rsense_t0*[1+a*T+b*T^2].

Figure 2:
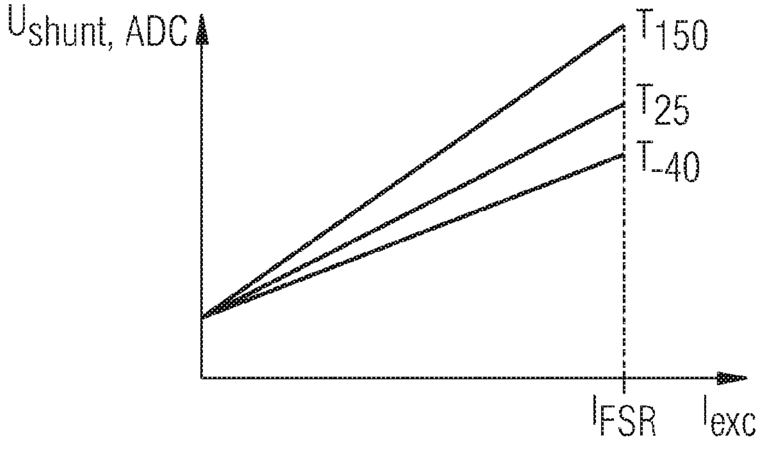
FIG. 2 illustrates a diagram showing the current and temperature dependence of the voltage drop across the measurement resistor.

FIG. 2 illustrates schematically a family of curves of the dependence of the voltage drop Ushunt on the current Iexc through the exciting coil for various temperature values, namely −40° C., 25° C., and 150° C.

All together, the above relationships give a measurement value of the voltage drop or the shunt voltage as $$Ushunt=I*[Rnom\_t0+/-dR]*[1+a*T+b*T^2].$$

Figure 3:
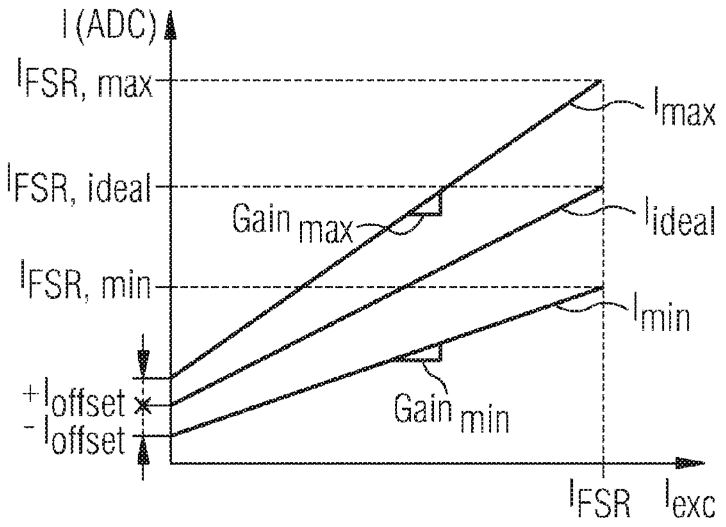
FIG. 3 illustrates a diagram for describing the error on the measurement signal.

In addition to the errors caused by the measurement resistor, in the measurement of the coil current of the exciting coil, errors also appear on the side of the measurement amplifier, that is, especially an offset (zero-point error) and gain or gradient error of the measurement amplifier. The profile of the shunt voltage under consideration of all of these influences is illustrated schematically in FIG. 3, where a positive and negative offset of the amplifier are designated by +Ioffset and −Ioffset, respectively, and a minimum and maximum gain value are designated by $Gain_{min}$ and $Gain_{max}$, respectively.

For compensating the temperature profile of the measurement resistor, its temperature-measured by temperature measurement on chip (not illustrated in FIG. 1)—is measured, the temperature profile is subjected to an A/D conversion, and finally compensated in the digital section.

The technology-dependent errors, i.e., the resistance value variation dR and the offset and gain errors of the measurement amplifier, are compensated in the digital section through the following procedure:

Applying a current ramp to the input

Recording the measurement values

Determining the offset

Correcting the offset

Determining the gain (dR and gain of the measurement amplifier)

Correcting the gain

Storing the values for offset and gain correction (fuses).

Figure 4:
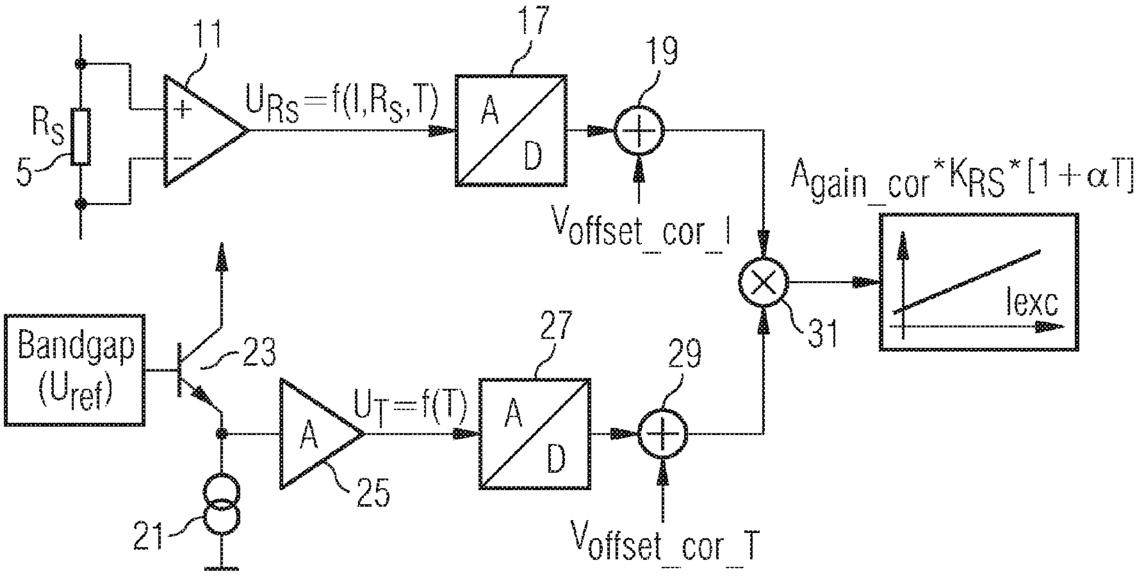
FIG. 4 illustrates a schematic representation for describing the measurement error compensation in the form of a block circuit diagram.

FIG. 4 illustrates schematically a circuit section used for this task of measurement error compensation, which is largely self-explanatory due to the selected symbols and labels.

The measurement of the voltage drop across the measurement resistor 5 is simplified here, since the measurement amplifier 11 is illustrated assigned directly to the A/D converter 17. In one summing stage 19, a voltage magnitude is added to the offset correction.

On the other side, input magnitudes for the compensation of the temperature profile are provided by using a T-sensor 21 and a bipolar transistor 23 fed a reference voltage Uref at the input of a temperature signal measurement amplifier 25. Another summing stage 29, in which a temperature offset voltage is added to the digitized temperature signal, is provided at the output of a T-signal A/D converter 27 connected after the temperature signal measurement amplifier 25. The offset-corrected output signals of the summing stages 19 and 29 are finally fed to a multiplication stage 31, in which the final compensation processing is executed according to the relationship illustrated in the figure.

Figure 5:
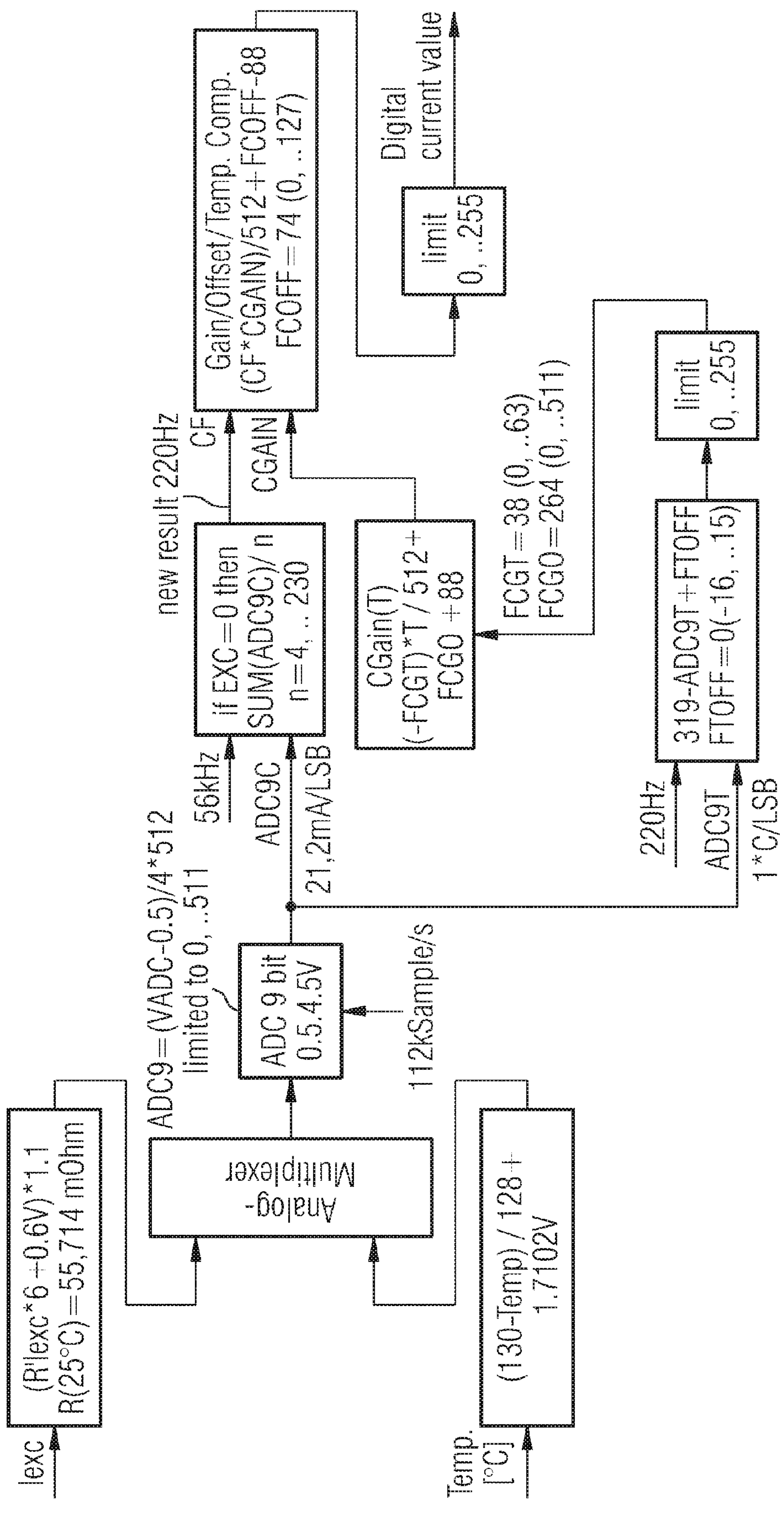
FIG. 5 illustrates an illustrative system representation in the form of a block circuit diagram, with information on relevant parameters and quantities.

FIG. 5 illustrates, in a representation formed as a synergistic diagram from the flow chart and block circuit diagram, details on a construction of the processing and compensation algorithm, whose principles were described above.

For operating the circuit illustrated in FIG. 1 and described above under special consideration of the measurement of the coil or exciting current of the generator, the following is noted:

During the freewheeling phase, the exciting current Iexc of the generator flows via the freewheeling diode 3 and the measurement resistor 5. For measuring the shunt voltage Ushunt a full differential measurement amplifier is used as the measurement amplifier 11. If the driver circuit (gate driver) 9 is active, the entire current flows via the switch element 7 and the voltage at the node of the freewheeling path with the exciting coil Exc reaches the value of the battery voltage VBA. In this phase, the inputs of the measurement amplifier 11 are short-circuited to ground, in order not to destroy the amplifier.

Figure 6:
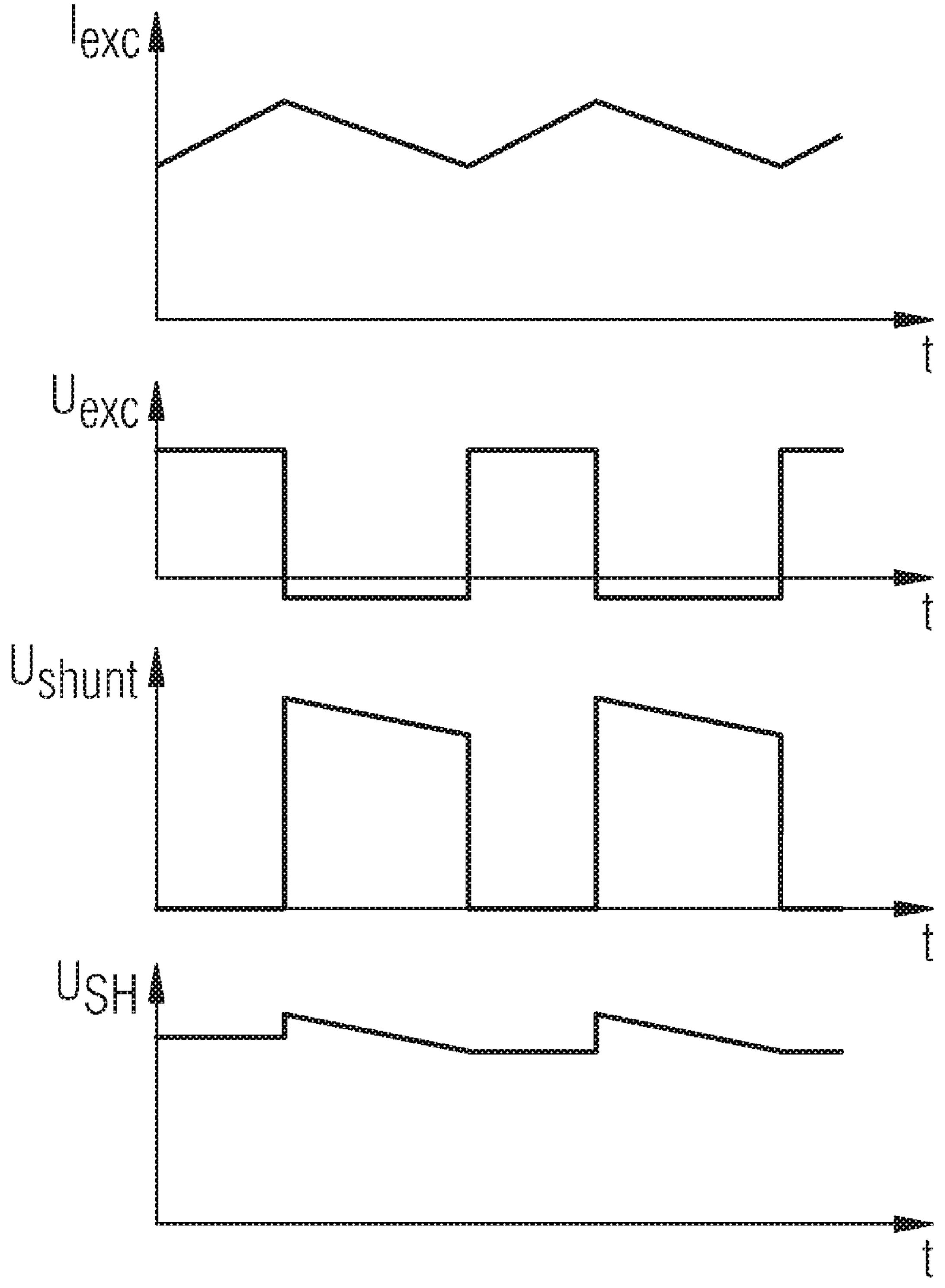
FIG. 6 illustrates a collection of diagrams for describing the time dependence of various relevant measurement quantities.

FIG. 6 illustrates the profile of the shunt voltage or the voltage drop across the measurement resistor 5 as a function of time, recorded parallel to the exciting current Iexc, the voltage Uexc across the exciting coil, and USH.

For measuring the average value of the exciting current, in the freewheeling case only, the shunt voltage is necessary, which is why the sample-and-hold circuit 13 is connected after the measurement amplifier 11. The voltage supplied to the output of the sample-and-hold circuit and still low-pass filtered is subjected to A/D conversion, and the measurement values during the freewheeling phase are summed and finally used for determining the average value.

For a direct current of 100% it is no longer necessary to measure the exciting current. To prevent no measurement values from being available for time phases that are too long, the driver 9 is deactivated after a preset time period, in order to end the state of 100% DC and to be able to measure the current in the freewheeling path. After a certain number of digitized current values are provided (for example, four), the driver is reactivated and thus re-establishes the normal operating state. For guaranteeing rapid measurement of the shunt voltage, in this phase the cutoff frequency of the low-pass filter 15 is also changed suitably.

Figure 7:
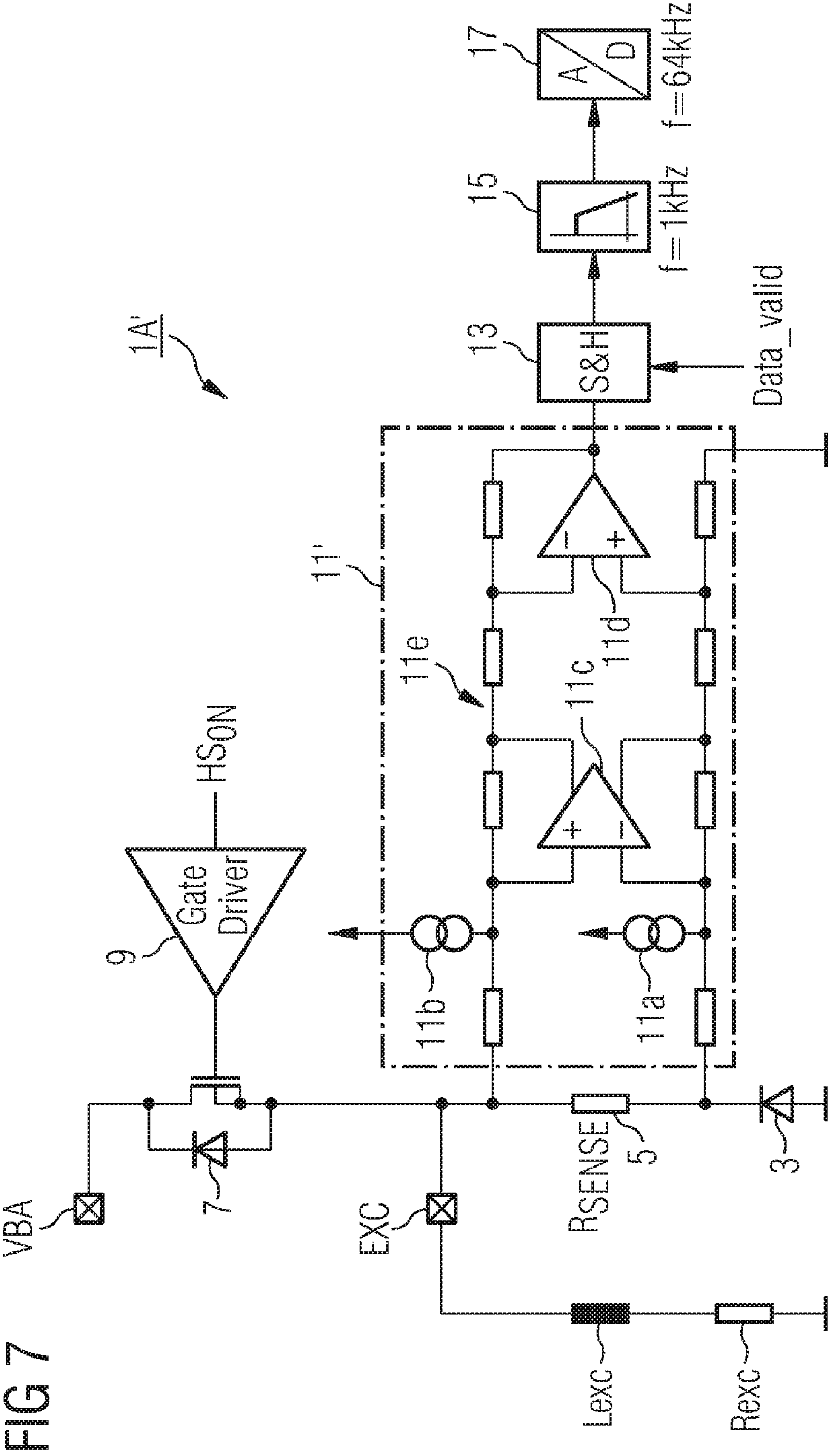
FIG. 7 illustrates a block circuit diagram for a construction of the circuit arrangement according to one embodiment modified relative to the construction according to FIG. 1.

FIG. 7 illustrates, in a partial view of the regulating circuit 1 according to FIG. 1 (while leaving out the digital section), a modified construction of this circuit, which was referenced above in the description of the full differential measurement amplifier. This is designated in the figure by the symbol 11' and includes, on the input side, two current sources 11*a*, 11*b*, as well as two operational amplifiers 11*c*, 11*d*, which are connected one after the other and which are connected to each other in a known way via a suitable resistor network 11*e*. The input resistors and current sources on the amplifier input are used as a level shifter in this construction.

With regard to a time setting of the measurement period (blanking period) of ca. 200 μs, changing the cutoff frequency of the low-pass filter from typically 1 kHz to half the sampling rate of the A/D converter, thus 32 kHz for an A/D sampling rate of 64 kHz, is advantageous. In this way, sufficient measurement values can be obtained during the short measurement period.

The construction of the invention is not limited to the embodiments and aspects illustrated above, but instead is possible in any combination of the features of the dependent claims and a plurality of modifications, which lie within the scope of technical activity.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. An integrated circuit arrangement for current regulation of an electromagnetic load comprising:

a coil;

a power switch element;

a freewheeling diode;

an integrated measurement resistor for measuring the coil current;

wherein the measurement resistor is arranged in a freewheeling path of the circuit arrangement in series between the freewheeling diode and the power switch element; and digital processing means connected after a voltage measurement device assigned to the voltage measuring device for at least partial compensation of resistor manufacturing variations and/or temperature influences on the voltage signal and/or an error due to analog voltage signal processing;

wherein a temperature sensor is assigned at least indirectly to the measurement resistor and a temperature measurement signal is fed to the digital processing means for temperature compensation of the voltage signal based on a stored correction curve.

2. The integrated circuit arrangement of claim 1, wherein the voltage measurement device has a measurement amplifier burdened with an offset and an amplification error, and the digital processing means are constructed for offset correction and for linked correction of the errors resulting from the resistor manufacturing variations and the amplification error.

3. The integrated circuit arrangement of claim 1, wherein the temperature sensor is arranged on the chip carrying the circuit arrangement, such that it detects the temperature of the chip.

4. The integrated circuit arrangement of claim 1, wherein the digital processing means is connected on the output side to the input of a driving stage of the power switch element for its activation or deactivation as a function of a corrected measurement value of the coil current.

5. The integrated circuit arrangement of claim 1, wherein an electromagnetic load comprises one of an electric motor, generator, and solenoid value.

6. An integrated circuit arrangement for current regulation of an electromagnetic load comprising:

a coil;

a power switch element;

a freewheeling diode;

an integrated measurement resistor for measuring the coil current;

wherein the measurement resistor is arranged in a freewheeling path of the circuit arrangement in series between the freewheeling diode and the power switch element; and digital processing means connected after a voltage measurement device assigned to the voltage measuring device for at least partial compensation of resistor manufacturing variations and/or temperature influences on the voltage signal and/or an error due to analog voltage signal processing;

wherein error correction control means for applying an input current rising linearly with a preset gradient for executing a process of the error detection and compensation magnitude determination.

7. An integrated circuit arrangement for current regulation of an electromagnetic load comprising:

a coil;

a power switch element;

a freewheeling diode;

an integrated measurement resistor for measuring the coil current;

wherein the measurement resistor is arranged in a freewheeling path of the circuit arrangement in series between the freewheeling diode and the power switch element; and digital processing means connected after a voltage measurement device assigned to the voltage measuring device for at least partial compensation of resistor manufacturing variations and/or temperature influences on the voltage signal and/or an error due to analog voltage signal processing;

wherein the voltage measurement device has a full differential measurement amplifier and a sample-and-hold circuit connected to its output for providing voltage measurement values during only a freewheeling operating phase of the circuit arrangement.

8. The integrated circuit arrangement of claim 7, wherein the output of the sample-and-hold circuit is connected to the input of a low-pass filter, especially with an adjustable cutoff frequency, and its output is connected to the input of an A/D converter for the output of digitized voltage measurement values from only the freewheeling operating phase.

9. The integrated circuit arrangement of claim 7, wherein measurement process control means for deactivating and reactivating the power switch element as a function of a predefined time dependence of the coil current, especially a preset time period of a pure direct current, for triggering a current measurement during the freewheeling operating phase.

10. The integrated circuit arrangement of claim 7, wherein the voltage measurement device has two differential amplifiers connected one after the other by means of a resistor network with inverse input polarity and between ground and the input of the sample-and-hold circuit.

11. An integrated circuit comprising:

a power switch element coupled to a voltage source;

a measurement resistor coupled to the power switch element;

a freewheeling diode coupled to the measurement resistor;

a coil coupled between the power switch element and the measurement resistor such that the measurement resistor measures the coil current;

a voltage measurement device coupled across the measurement resistor to sample the voltage signal thereon; and a process controller coupled to the voltage measurement device configured to compensate for variations on the voltage signal;

wherein a temperature sensor is assigned at least indirectly to the measurement resistor and a temperature measurement signal is fed to the process controller for temperature compensation of the voltage signal based on a stored correction curve.

12. The integrated circuit of claim 11, wherein the process controller is configured to compensate for resistor manufacturing variations on the voltage signal.

13. The integrated circuit arrangement of claim 12, wherein the voltage measurement device has a measurement amplifier burdened with an offset and an amplification error, and the process controller is constructed for offset correction and for linked correction of the errors resulting from the resistor manufacturing variations and the amplification error.

14. The integrated circuit of claim 11, wherein the process controller is configured to compensate for temperature influences on the voltage signal.

15. The integrated circuit of claim 11, wherein the process controller is configured to compensate for error due to analog processing of the voltage signal.

16. The integrated circuit arrangement of claim 15, wherein error correction control means for applying an input current rising linearly with a preset gradient for executing a process of the error detection and compensation magnitude determination.

17. The integrated circuit arrangement of claim 11, wherein the temperature sensor is arranged on the chip carrying the circuit arrangement, such that it detects the temperature of the chip.

18. The integrated circuit arrangement of claim 11, wherein the voltage measurement device has a full differential measurement amplifier and a sample-and-hold circuit connected to its output for providing voltage measurement values during only a freewheeling operating phase of the circuit arrangement.

* * * * *